US011106963B2

(12) United States Patent
Buhler et al.

(10) Patent No.: US 11,106,963 B2
(45) Date of Patent: Aug. 31, 2021

(54) TAG EMBEDDING SYSTEM

(71) Applicant: 8370605 Canada Inc., Alfred (CA)

(72) Inventors: James Buhler, Cranbrook (CA); Luke Elias, Cumberland (CA); Lester A. Buhler, St. Clair, MI (US)

(73) Assignee: 8370605 Canada Inc., Alfred (CA)

( * ) Notice: Subject to any disclaimer, the term of this patent is extended or adjusted under 35 U.S.C. 154(b) by 161 days.

(21) Appl. No.: 16/296,759

(22) Filed: Mar. 8, 2019

(65) Prior Publication Data

US 2020/0285930 A1    Sep. 10, 2020

(51) Int. Cl.
*G06K 19/077* (2006.01)

(52) U.S. Cl.
CPC ... *G06K 19/07758* (2013.01); *G06K 19/0772* (2013.01)

(58) Field of Classification Search
CPC .............. G06K 19/07758; G06K 19/0772
See application file for complete search history.

(56) References Cited

U.S. PATENT DOCUMENTS

| | | | |
|---|---|---|---|
| 5,947,524 A * | 9/1999 | Podosek ................ | B42F 9/008 281/45 |
| 8,646,697 B1 | 2/2014 | DePrisco et al. | |
| 2009/0160653 A1 * | 6/2009 | Yeh .................. | G06K 19/07749 340/572.7 |
| 2011/0050426 A1 * | 3/2011 | Choong ........... | G06K 19/07771 340/572.1 |
| 2016/0307092 A1 * | 10/2016 | Wable .............. | G06K 19/07773 |
| 2018/0330220 A1 * | 11/2018 | Gaspari ............ | G06K 19/07783 |

\* cited by examiner

*Primary Examiner* — Thien M Le
*Assistant Examiner* — Asifa Habib
(74) *Attorney, Agent, or Firm* — Bereskin & Parr LLP (57) ABSTRACT

A work piece tagging system is described herein. The system includes a work piece having a body. The body includes an outer surface defining an opening and a tubular portion defining a recess extending inwardly from the opening. The tubular portion has a first interior surface opposed to the opening. The system also includes a tag having a fold extending from a first side to a second side of the tag. The fold defines a first corner, a second corner and first and second sections of the tag. A length of the fold is less than a width of the opening and greater than a width of at least a portion of the first interior surface. The tag is retained in the recess by the first and second corners engaging the portion of the first interior surface when the tag is inserted fold first into the recess.

20 Claims, 5 Drawing Sheets

TAG EMBEDDING SYSTEM

TECHNICAL FIELD

The present disclosure relates generally to radio frequency identification (RFID) tags and more specifically, to systems and methods of tagging work pieces with RFID tags.

BACKGROUND

Radio Frequency Identification (RFID) tags are a type of tracking system that uses smart barcodes to identify items. For instance, RFID tags are generally used to track manufactured parts and work pieces. RFID tags contain electronically stored information that can be retrieved using a scanner or a reader without contacting the tag.

RFID are commonly used in manufacturing settings where they can be attached to a work piece to provide for the work piece to be electronically tracked through production to completion of a finished article. When attached to the work piece, the RFID tag can include data for inventory control and instructions for incorporating the work piece in to a product during manufacturing.

In many settings, it may be undesirable for RFID tags to be visible or in places where they may be easily damaged or detached from the work piece.

Accordingly, there is a need for improved systems and methods of tagging work pieces with RFID tags, particularly in positions where the RFID is not visible or easily damaged.

SUMMARY

The present disclosure provides systems and methods of embedding radio frequency identification tags in articles.

In some embodiments, a work piece tagging system is described herein. The system includes a work piece having a body. The body includes an outer surface defining an opening and a tubular portion defining a recess extending inwardly from the opening. The tubular portion has a first interior surface opposed to the opening. The system also includes a tag having a fold extending from a first side of the tag to a second side of the tag. The fold defines a first corner on the first side of the tag, a second corner on the second side of the tag and first and second sections of the tag on a same side of the fold. The fold has a length that is less than a width of the opening and greater than a width of at least a portion of the first interior surface of the tubular portion. The tag is retained in the recess by the first and second corners of the tag engaging the portion of the first interior surface when the tag is inserted fold first through the opening into the recess.

In another aspect, a work piece is described herein. The work piece includes a body comprising an outer surface defining an opening and a tubular portion defining a recess extending inwardly from the opening. The tubular portion has a first interior surface opposed to the opening. The work piece also includes a tag having a fold extending from a first side of the tag to a second side of the tag. The fold defines a first corner on the first side of the tag, a second corner on the second side of the tag and first and second sections of the tag on a same side of the fold. The fold has a length that is less than a width of the opening and greater than a width of at least a portion of the first interior surface of the tubular portion to provide for the tag to be retained in the recess by the first and second corners of the tag engaging the portion of the first interior surface when the tag is inserted through the opening into the recess fold first.

In another aspect, a method of tagging work pieces is described herein. The method includes providing a work piece having a body, the body comprising an outer surface defining an opening; and a tubular portion defining a recess extending inwardly from the opening, the tubular portion having a first interior surface opposed to the opening. The method also includes providing a tag having a fold extending from a first side of the tag to a second side of the tag, the fold defining a first corner on the first side of the tag, a second corner on the second side of the tag and first and second sections of the tag on a same side of the fold, the fold having a length that is less than a width of the opening of the work piece and greater than a width of at least a portion of the first interior surface. The method also includes inserting the tag fold first through the opening and into the recess until the corners of the tag engage the portion of the first interior surface to retain the tag in the recess.

These and other features and advantages of the present application will become apparent from the following detailed description taken together with the accompanying drawings. However, it should be understood that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

top view of a work piece of the work piece tagging system of FIG. 1, according to one embodiment.

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodiments described herein will appear from the following description taken together with the accompanying drawings.

DETAILED DESCRIPTION

The following examples are presented in a non-limiting manner.

For example, according to systems and work pieces described herein, one of the first and second sections of the tag may carry a radio frequency identification (RFID) tag.

For example, according to systems and work pieces described herein, at least a portion of the first section of the tag may engages a second interior surface of the tubular portion when the tag is inserted into the recess, the second interior surface being perpendicular to the first interior surface.

For example, according to systems and work pieces described herein, at least a portion of the second section of the tag may engage a third interior surface of the tubular portion when the tag is inserted into the recess, the third interior surface being perpendicular to the first interior surface.

For example, according to systems and work pieces described herein, the portion of the first interior surface may have an arcuate shape For example, according to systems and work pieces described herein, the portion of the first interior surface may have a semi-circular shape.

For example, according to systems and work pieces described herein, the first interior surface may be a continuous surface that extends inwardly from the opening of the work piece.

For example, according to systems and work pieces described herein, the first section of the tag and the second section of the tag may be the same size.

For example, according to systems and work pieces described herein, the first and second corners of the tag may be configured to be embedded in the portion of the first interior surface of the tubular portion to retain the tag in the recess.

For example, according to systems described herein, the systems may further comprise a shuttle configured to be positioned against the fold when the tag is inserted through the opening and into the recess.

For example, according to systems and work pieces described herein, the tag may be made of paper, plastic or a combination of paper and plastic.

For example, according to methods described herein, providing the tag may include providing one of the first and second sections of the tag with a RFID tag.

For example, according to methods described herein, inserting the tag into the recess may include pressing a shuttle against the fold, the shuttle having a width that is about the same as a width of the tag; inserting the shuttle and the tag fold first through the opening and into the recess; and pressing the shuttle and the tag against the first interior surface of the tubular portion until the corners of the tag engage the portion of the first interior surface to retain the in the tag in the recess.

To promote an understanding of the principles of the disclosure, reference will now be made to the features illustrated in the drawings and no limitation of the scope of the disclosure is hereby intended. Any alterations and further modifications, and any further applications of the principles of the disclosure as described herein are contemplated as would normally occur to one skilled in the art to which the disclosure relates. For the sake of clarity, some features not relevant to the present disclosure may not be shown in the drawings.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. In the following description and in the claims, the terms "including" and "comprising" are used in an open-ended fashion, and thus, should be interpreted to mean "including, but not limited to."

The articles "the," "a" and "an" are not necessarily limited to mean only one, but rather are inclusive and open ended to include, optionally, multiple such elements.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

"At least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, to at least one, optionally including more than one, A, with no B present (and optionally including entities other than B); to at least one, optionally including more than one, B, with no A present (and optionally including entities other than A); to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein, the phrases "for example," "as an example," and/or simply the terms "example" or "exemplary," when used with reference to one or more components, features, details, structures, methods and/or figures according to the present disclosure, are intended to convey that the described component, feature, detail, structure, method and/or figure is an illustrative, non-exclusive example of components, features, details, structures, methods and/or figures according to the present disclosure. Thus, the described component, feature, detail, structure, method and/or figure is not intended to be limiting, required, or exclusive/exhaustive; and other components, features, details, structures, methods and/or figures, including structurally and/or functionally similar and/or equivalent components, features, details, structures, methods and/or figures, are also within the scope of the present disclosure. Any embodiment or aspect described herein as "exemplary" is not to be construed as preferred or advantageous over other embodiments.

Herein, systems and methods of tagging a work piece are provided. Work pieces including tags are also provided.

Figure 1:
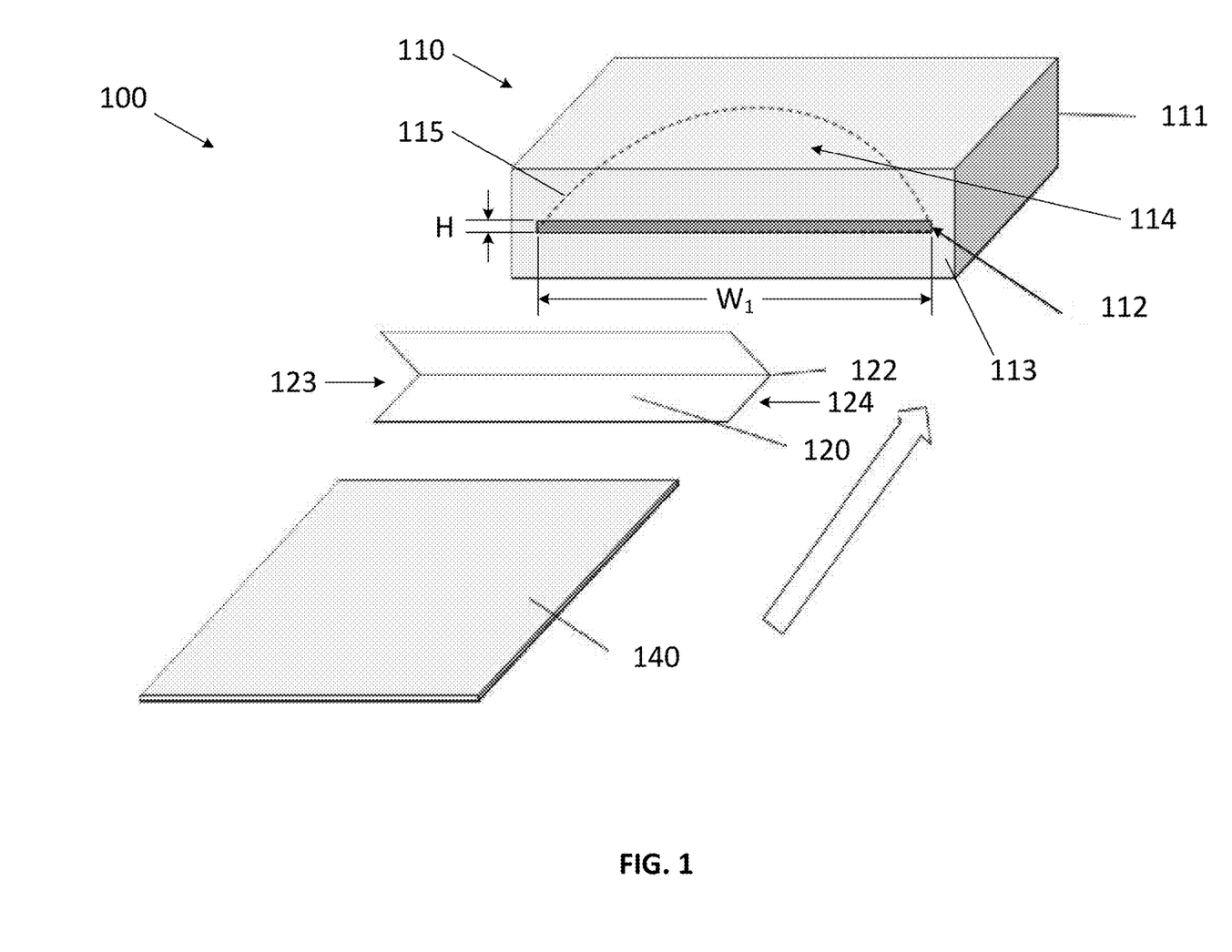
FIG. 1 is a perspective view of a work piece tagging system including a work piece, a tag and a shuttle, according to one embodiment.

Referring now to FIG. 1, a work piece tagging system 100 is shown therein. System 100 includes a work piece 110 and a tag 120. In some embodiments, the system 100 also includes a shuttle 140 for inserting the tag 120 into the work piece 110.

Work piece 110 can be any object that has been or can be worked on by a tool or a machine, such as but not limited to a beam or other dimensioned piece of lumber, fiber board or a piece of composite material.

Work piece 110 has a body 111 including an outer surface 113 and a tubular portion 115. Outer surface 113 may be a planar surface and defines an opening 112. Opening 112 can have any shape that provides for opening 112 to receive at least one tag 120. In the embodiment shown in the Figures, opening 112 has a slot-like shape with a width $W_1$ that is greater than a height H.

Shuttle 140 may be made of any rigid material and have a thickness that is less than the height H of the opening 112 and a width that is less than the width $W_1$ of the opening 112.

Figure 2:
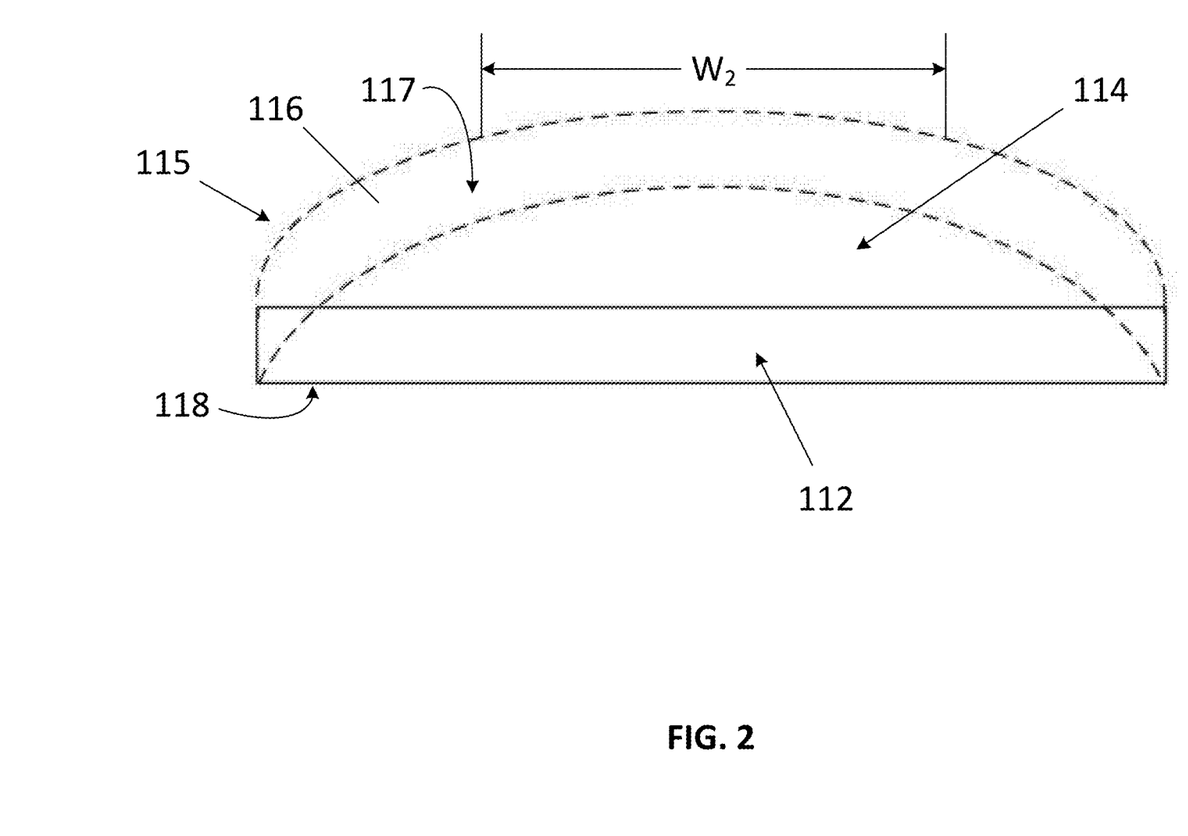
FIG. 2 is a perspective view of a tubular portion of the work piece of the work piece tagging system of FIG. 1, according to one embodiment.

Turning to FIG. 2, illustrated therein is tubular portion 115 of the work piece 110. Tubular portion 115 extends inwardly from the opening 112 in outer surface 113 of work piece 110 to define recess 114. Recess 114 can have any shape to provide for retaining tag 120 therein when the tag 120 is inserted through the opening 112 into the recess 114.

Tubular portion 115 includes a first interior surface 116 that is opposed to the opening 112. In the embodiment shown in the drawings, first interior surface 116 extends inwardly from either side of the opening 112 and has a continuous, semi-circular shape. In some embodiments, first interior surface 116 may have an arcuate shape. In other embodiments, only a portion of first interior surface 116 may have either a semi-circular or an arcuate shape. In still other embodiments, interior surface 113 may be entirely opposed to opening 112 but not extend from either side of the opening 112. Rather, first interior surface 116 may extend along width $W_1$ of the opening 112 and be indirectly connected to sides of the opening 112.

First interior surface 116 can generally have any shape to engage with at least a portion of the tag 120 to retain the tag 120 in the recess 114. At least a portion of the first interior surface 116 is shaped to have a width $W_2$ that is less than width $W_1$ of the opening 112. For instance, at least a portion of first interior surface 116 is shaped to provide two points of contact for the tag 120 (e.g. corners of the tag 120) when the tag 120 is inserted into the recess 114.

Herein, it should be noted that the term "engage" refers to a state or condition of physically touching and includes, but is not limited to, any or all of contacting, touching, connecting, adhering, and/or embedding, both directly and indirectly.

In the embodiment shown in the figures, first interior surface 116 is shaped to retain tag 120 in the recess 114 by the corners 125, 126 of the tag 120 engaging with the first interior surface 116. In some embodiments, the corners 125, 126 exert a force outwardly from the tag 120 against the first interior surface 116 to retain the tag 120 in the recess 114. In other embodiments, the tag 120 is retained in the recess 114 by friction between the corners 125, 126 of the tag 120 and the first interior surface 116 of the recess 114.

In some embodiments, first interior surface 116 may be a continuous surface extending inwardly from the opening 112. In other embodiments, first interior surface 116 may include one or more continuous surfaces extending inwardly from the opening 112. In some embodiments, first interior surface 116 may be a continuous surface opposed to the opening 112. In other embodiments, first interior surface 116 may include one or more continuous surfaces opposed to the opening 112.

For instance, first interior surface 116 may include two planar surfaces that meet at a joint, where the joint extends inwardly from the opening 112. In other embodiments, the first interior surface 116 may include two planar surfaces that meet at a joint, where the joint is opposed to the opening 112.

In the embodiment shown in the Figures, first interior surface 116 has a semi-circular shape and is a continuous surface that extends inwardly from both sides of the opening 112. In this embodiment, recess 114 may be formed in the work piece 110 by, for example but not limited to, a circular saw or the like pressed against the outer surface 113.

Tubular portion 115 may also include second and third interior surfaces 117 and 118, respectively. Generally, second interior surface 117 and third interior surface 118 are opposed to each other. In the embodiment shown in the Figures, second interior surface 117 and third interior surface 118 are each perpendicular to the opening 112. Second interior surface 117 and third interior surface 118 may also, either both or individually, be perpendicular to the first interior surface 116. In some embodiments, second interior surface 117 and third interior surface 118 may engage with a portion of tag 120 when tag 120 is inserted into the recess 114 and contribute to tag 120 being retained in the recess 114. For instance, second interior surface 117 and third interior surface 118 may engage with edges of the tag 120 when tag 120 is folded and inserted into the recess 114.

Figure 3:
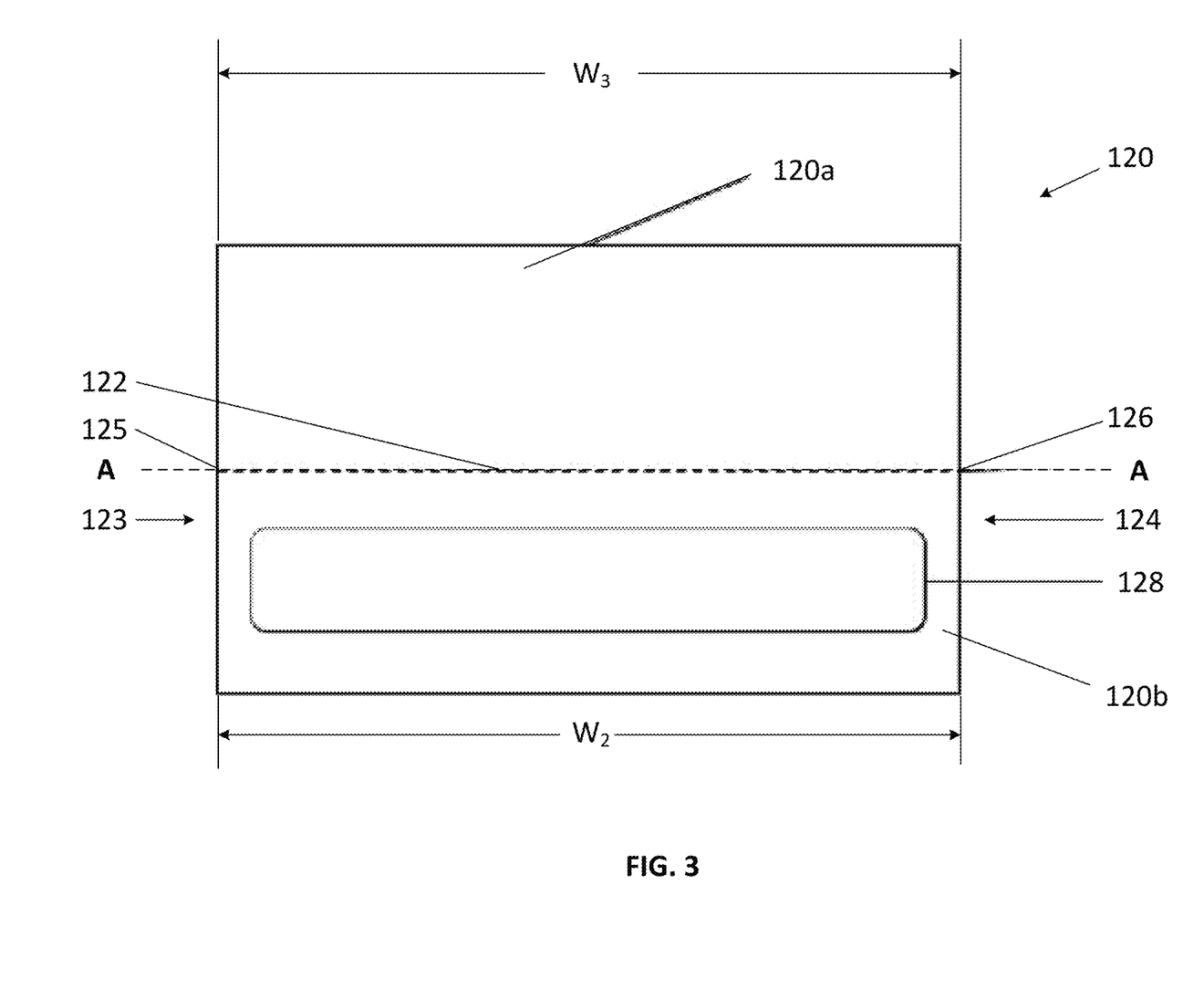
FIG. 3 is a top view of a tag of the work piece tagging system of FIG. 1 when the tag is in an open configuration, according to one embodiment.

Turning to FIG. 3, illustrated therein is a top view of a tag 120 of the system 100 when the tag 120 is in an open configuration. Tag 120 is generally made of a flexible material that provides for a fold 122 to be formed in the tag 120. For instance, tag 120 may be made of paper, plastic, or a combination of both. Tag 120 generally has a thickness that is sufficiently thin to provide for bending (i.e. about 0.25 mm or less).

Tag 120 includes a fold 122 extending from a first side 123 of the tag 120 to a second side 124 of the tag 120. In the embodiment shown in the Figures, fold 120 bisects the tag 120 into a first section 120a and a second section 120b.

At least one of first section 120a and a second section 120b carries a radio frequency identification (RFID) tag 128. In the embodiment shown in FIG. 3, RFID tag 128 is shown as being carried by second section 120b. In some embodiments, RFID tag 128 is attached to second section 120b with an adhesive and/or is sandwiched between two layers of paper or plastic and is positioned in about a middle of the second section 120b (i.e. equally spaced from each edge of the second section 120b and the fold 122).

RFID tag 128 generally includes any tag that uses an electromagnetic field to automatically identify and track tags attached to objects. RFID tag 128 contains electronically-stored information. RFID tag 128 may be a passive tag or an active tag. Passive tags generally collect energy from a nearby RFID reader's interrogating radio waves, whereas active tags include a local power source (such as a battery) and may operate at greater distances from a RFID reader than passive tags.

Fold 122 defines a first corner 125 on the first side 123 of the tag 120 and a second corner 126 on the second side 124 of the tag 120. Fold 122 has a length $W_3$ that generally corresponds to a width of the tag 120. Length $W_3$ is less than width $W_1$ of the opening 112. Length $W_3$ is also generally greater than width $W_2$ of at least a portion of the interior surface 116 of the recess 114. In this manner, the fold 122 provides for the tag 120 to be retained in the recess 114 by the first and second corners 125, 126, respectively, engaging at least a portion of the first interior surface 116 of the recess 114 when the tag 120 is inserted through the opening 112 into the recess 114.

Figure 4:
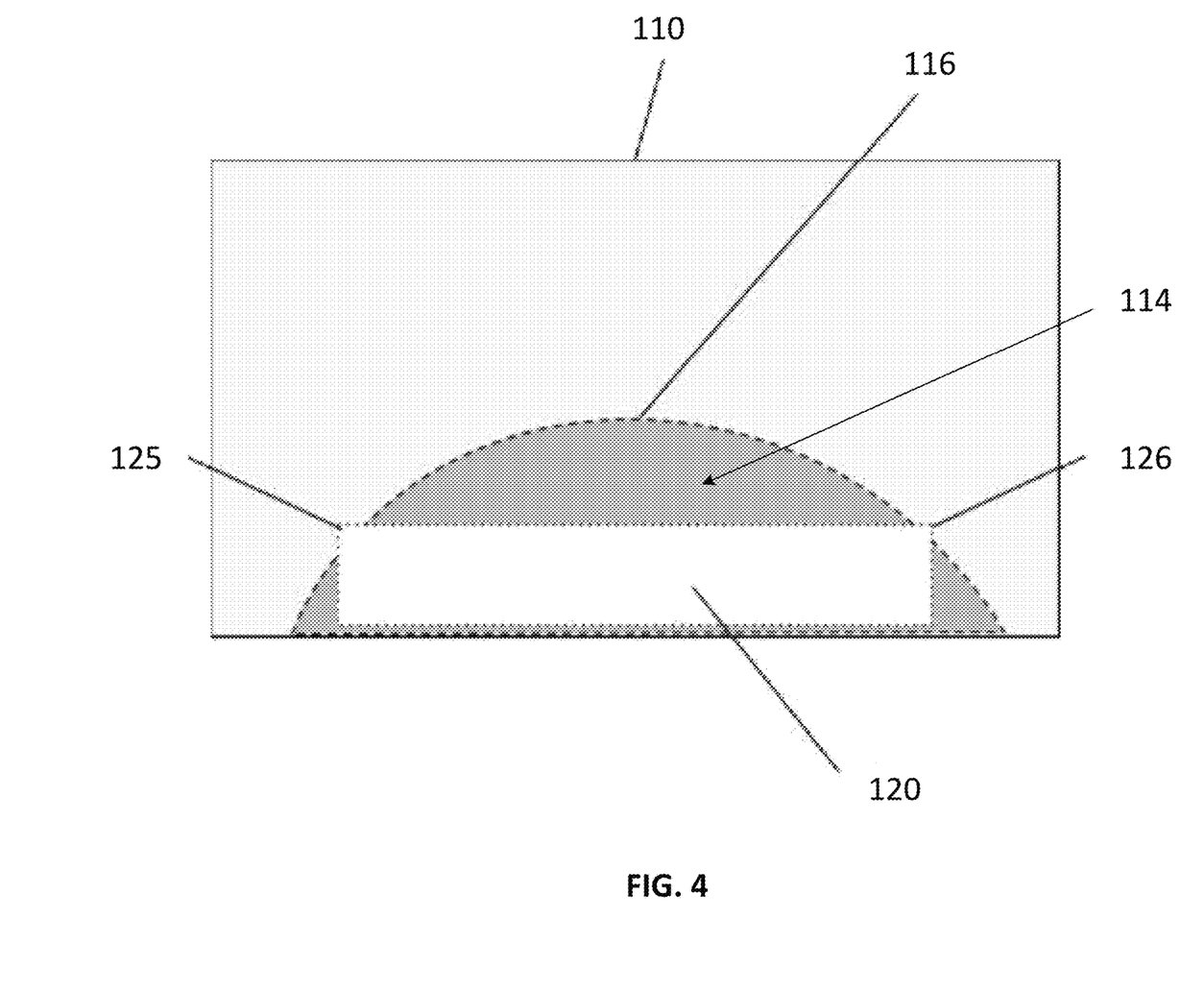
FIG. 4 is a top view of a work piece of the work piece tagging system of FIG. 1, according to one embodiment.

FIG. 4 shows a top down view of work piece 110 of FIG. 1 with tag 120 of FIG. 1 in a folded configuration (i.e. first section 120a and second section 120b are vertically spaced from each other and positioned on a same side of the fold 122) and inserted into recess 114, where tag 120 is shown in dotted lines. In this embodiment, fold 122 has been formed in tag 120 and tag 120, when in its folded configuration, has been inserted fold first into the recess 114 though the opening 112. Herein, "fold first" means that the tag 120 was inserted through the opening 112 and into the recess 114 with the first section 120a of the tag 120 and second section 120b of the tag 120 trailing the fold 122.

Fold 122 has an axis A that is generally parallel to the width $W_1$ of the opening 112 when the tag 120 is retained in the recess 114.

In some embodiments, the first section 120a and the second section 120b are urged upwardly and downwardly, respectively, when the tag 120 is inserted into the recess 114. In these embodiments, at least a portion of first section 120a (e.g. an edge thereof) may engage second interior surface 117 and/or at least a portion of second section 120b (e.g. an edge thereof) may engage third interior surface 118 to contribute to tag 120 being retained in the recess 114 (e.g. by friction).

Figure 5:
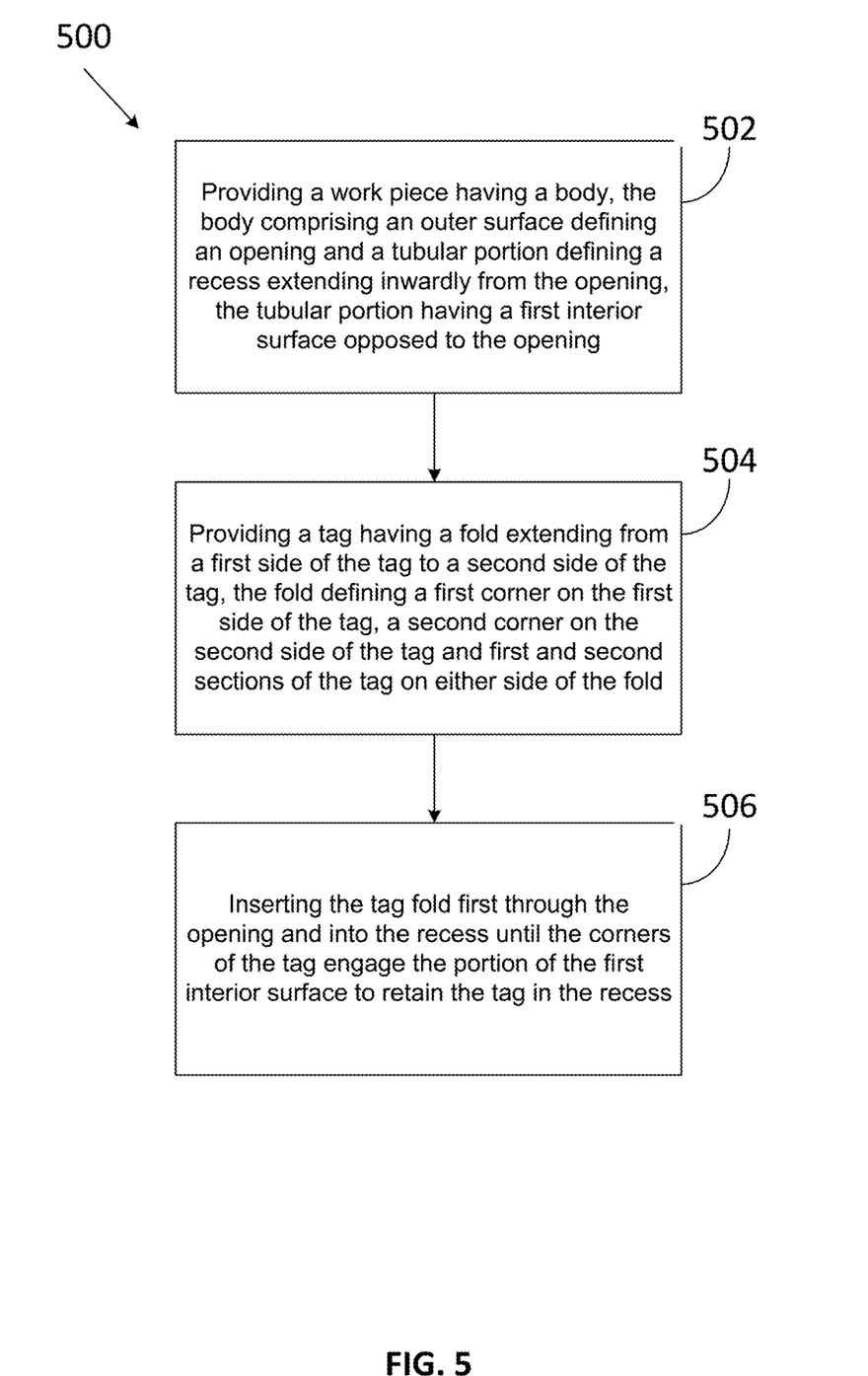
FIG. 5 is a block diagram of a method of tagging a work piece, according to one embodiment.

Referring now to FIG. 5, illustrated therein is a method of tagging a work piece 500. The method 500 includes a step 502 of providing a work piece such as work piece 110. As noted above, work piece 110 includes a tubular portion 115 defining a recess 114 extending inwardly from an opening 112 in an outer surface 113 of the work piece 110. First interior surface 116 of the tubular portion 115 is opposed to the opening 112.

Method 500 also includes a step 504 of providing a tag such as but not limited to tag 120 having a fold 122 extending from a first side 123 of the tag 120 to a second side 124 of the tag 120. The fold 122 defines a first corner 125 on the first side 123 of the tag 120, a second corner 126 on the second side 124 of the tag 120 and first and second sections 120a, 120b, respectively, of the tag 120 on either side of the fold 122. The fold 122 length $W_3$ is less than width $W_1$ of the opening 112 of the work piece 110 and is greater than width $W_2$ of at least a portion of an interior surface 116 of the recess 114.

Method 500 also includes a step 506 of inserting the tag 110 into the recess 114 fold first through the opening 112 until the corners 125, 126 of the tag 120 engage the portion of the first interior surface 116 to retain the tag 120 in the recess 114.

In some embodiments, the system 100 may include a shuttle 140 (see FIG. 1). Shuttle 140 may be used to insert the tag 120 into the work piece 110. In some embodiments, shuttle 140 has a width that is generally the same as the width $W_3$ of the tag 120. A user of the shuttle 140 can press the shuttle 140 against fold 122 of tag 120 when the tag 120 is in its folded configuration and insert the tag 120 into the recess 114 thorough the opening 112. A user may then press the shuttle 140 against the first interior surface 116 to facilitate engagement of the tag 120 and the first interior surface 116 to retain the tag 120 in the recess 114. The shuttle 140 can then be withdrawn from the recess 114, leaving the tag 120 retained in the work piece 110.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

We claim:

1. A work piece tagging system comprising:
a work piece having a body, the body comprising:
an outer surface defining an opening; and
a tubular portion defining a recess extending inwardly from the opening, the tubular portion having a first interior surface opposed to the opening; and
a tag having a fold extending from a first side of the tag to a second side of the tag, the fold defining a first corner on the first side of the tag, a second corner on the second side of the tag and first and second sections of the tag on a same side of the fold, the fold having a length that is less than a width of the opening,
wherein the first interior surface has a width within the recess that is less than a length of the fold of the lag to provide for the tag to be retained in the recess by the first and second corners of the tag engaging the first interior surface when the tag is inserted fold first through the opening into the recess.

2. The system of claim 1, wherein one of the first and second sections of the tag carries a radio frequency identification (RFID) tag.

3. The system of claim 1, wherein at least a portion of the first section of the tag engages a second interior surface of the tubular portion when the tag is inserted into the recess, the second interior surface being perpendicular to the first interior surface.

4. The system of claim 3, wherein at least a portion of the second section of the tag engages a third interior surface of the tubular portion when the tag is inserted into the recess, the third interior surface being perpendicular to the first interior surface.

5. The system of claim 1, wherein the first interior surface has an arcuate shape.

6. The system of claim 1, wherein a portion of the first interior surface has a semi-circular shape.

7. The system of claim 6, wherein the first interior surface has a continuous, semi-circular shape that extends inwardly from a first side of the opening to a second side of the opening.

8. The system of claim 1, wherein the first section of the tag and the second section of the tag are the same size.

9. The system of claim 1, wherein the first and second corners of the tag are configured to be embedded in the first interior surface of the tubular portion to retain the tag in the recess.

10. The system of claim 1, further comprising a shuttle configured to be positioned against the fold when the tag is inserted through the opening and into the recess.

11. A work piece comprising:
a body comprising:
an outer surface defining an opening; and
a tubular portion defining a recess extending inwardly from the opening, the tubular portion having a first interior surface opposed to the opening; and
a tag having a fold extending from a first side of the tag to a second side of the tag, the fold defining a first corner on the first side of the tag, a second corner on the second side of the tag and first and second sections of the tag on a same side of the fold, the fold having a length that is less than a width of the opening;
wherein the first interior surface has a width within the recess that is less than a length of the fold of the tag to provide for the tag to be retained in the recess by the first and second corners of the tag engaging the first interior surface when the tag is inserted fold first through the opening into the recess.

12. The work piece of claim 11, wherein one of the first and second sections of the tag carries a RFID tag.

13. The work piece of claim 11, wherein at least a portion of the first section of the tag engages a second interior surface of the tubular portion when the tag is inserted into the recess, the second interior surface being perpendicular to the first interior surface.

14. The work piece of claim 13, wherein at least a portion of the second portion of the tag engages a third interior surface of the tubular portion when the tag is inserted into the recess, the third interior surface being perpendicular to the first interior surface.

15. The work piece of claim 11, wherein the first interior surface has an arcuate shape.

16. The work piece of claim 11, wherein a portion of the first interior surface has a semi-circular shape.

17. The work piece of claim 16, wherein the first interior surface has a continuous, semi-circular shape that extends inwardly from a first side of the opening to a second side of the opening.

18. The work piece of claim 11, wherein the first and second corners of the tag are configured to be embedded in the first interior surface of the tubular portion to retain the tag in the recess.

19. A method of tagging work pieces, the method comprising:
providing a tag having a fold extending from a first side of the tag to a second side of the tag, the fold defining a first corner on the first side of the tag, a second corner on the second side of the tag and first and second sections of the tag on a same side of the fold, one of the first and second sections carrying an RFID tag;
providing a work piece having a body, the body comprising:
an outer surface defining an opening; and
a tubular portion defining a recess extending inwardly from the opening, the tubular portion having a first interior surface opposed to the opening, the first interior surface having a width within the recess that is less than a length of the fold of the tag when the tag is in a folded configuration; and
inserting the tag fold first through the opening and into the recess until the corners of the tag engage the first interior surface to retain the tag in the recess.

20. The method of claim 19, wherein the step of inserting the tag into the recess includes:
pressing a shuttle against the fold, the shuttle having a width that is about the same as a width of the tag;
inserting the shuttle and the tag fold first through the opening and into the recess; and
pressing the shuttle and the tag against the first interior surface of the tubular portion until the corners of the tag engage the first interior surface to retain the tag in the recess.

\* \* \* \* \*

UNITED STATES PATENT AND TRADEMARK OFFICE
CERTIFICATE OF CORRECTION

PATENT NO. : 11,106,963 B2
APPLICATION NO. : 16/296759
DATED : August 31, 2021
INVENTOR(S) : James Buhler, Luke Elias and Lester A. Buhler Page 1 of 1

It is certified that error appears in the above-identified patent and that said Letters Patent is hereby corrected as shown below:

In the Claims

Claim 1, Column 8, Line 36, "lag" should read "tag"

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*